US012325228B2

(12) United States Patent
Hotani

(10) Patent No.: US 12,325,228 B2
(45) Date of Patent: Jun. 10, 2025

(54) DRYING DEVICE AND IMAGE FORMING SYSTEM

(71) Applicant: KYOCERA Document Solutions Inc., Osaka (JP)

(72) Inventor: Tomoya Hotani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 159 days.

(21) Appl. No.: 18/548,459

(22) PCT Filed: Feb. 25, 2022

(86) PCT No.: PCT/JP2022/007981

§ 371 (c)(1),
(2) Date: Aug. 30, 2023

(87) PCT Pub. No.: WO2022/186084

PCT Pub. Date: Sep. 9, 2022

(65) Prior Publication Data

US 2024/0131853 A1 Apr. 25, 2024
US 2024/0227416 A9 Jul. 11, 2024

(30) Foreign Application Priority Data

Mar. 1, 2021 (JP) ................................ 2021-031495

(51) Int. Cl.
*B41J 11/00* (2006.01)
*B41J 13/03* (2006.01)
*B41J 13/08* (2006.01)
*B65H 5/02* (2006.01)

(52) U.S. Cl.
CPC ......... *B41J 11/00216* (2021.01); *B41J 13/03* (2013.01); *B41J 13/08* (2013.01); *B65H 5/021* (2013.01); *B65H 2403/94* (2013.01); *B65H 2404/2682* (2013.01)

(58) Field of Classification Search
CPC ...... B41J 11/00216; B41J 13/03; B41J 13/08; B41J 11/0022; B41J 11/0024; B41J 2/01; B65H 5/021; B65H 2403/94; B65H 2404/2682; F26B 13/10; F26B 25/00
See application file for complete search history.

(56) References Cited

U.S. PATENT DOCUMENTS

2019/0283462 A1* 9/2019 Oura ...................... B41J 13/009

FOREIGN PATENT DOCUMENTS

JP S59-063368 U 4/1984
JP 2003-070573 A 3/2003

* cited by examiner

*Primary Examiner* — Bradley W Thies
(74) *Attorney, Agent, or Firm* — Studebaker Brackett PLLC

(57) ABSTRACT

A drying device (7) is a drying device which dries a sheet while conveying the sheet. The drying device (7) includes a conveying part (15) which conveys the sheet in a predetermined conveyance direction; a heating part (13) which is arranged above the conveying part (15) and dries the sheet conveyed by the conveying part (15); and a supporting part (17) which supports the conveying part (15) in a heating position where the sheet is heated by the heating part (13), by power supplying, wherein when the power supplying to the supporting part (17) is cut off, a force by which the conveying part (15) is supported in the heating position is weakened, and the conveying part (15) is lowered to a retreating position separated downward from the heating part (13).

11 Claims, 5 Drawing Sheets

DRYING DEVICE AND IMAGE FORMING SYSTEM

TECHNICAL FIELD

The present invention relates to a drying device which heats a sheet on which an image is formed by an image forming device, while conveying the sheet to dry the sheet and an image forming system including the drying device.

BACKGROUND

A sheet on which an image is formed by an inkjet image forming device is generally dried by a drying device. The drying device heats the sheet by a heat source while conveying the sheet. Drying is done by flowing heated warm air or using radiant heat. Generally, a halogen heater that emits infrared radiation is used as the heat source for radiant heat. In such a drying device, there is a problem that the heat remaining in the heat source raises the temperature of the sheet when the device stops due to an abnormality or a power cut.

Against such a problem, Patent Document 1 discloses a drying device in which a temperature sensing element is provided in the vicinity of a flash lamp (heat source). If the temperature detected by the temperature sensing element exceeds a certain temperature, the device announces an abnormality and then is stopped. Patent Document 2 also discloses an ink drying device provided with a shutter capable of blocking light from a halogen heater (heat source).

PRIOR ART DOCUMENTS

Patent Literature

Patent Document 1: Japanese Utility Model No. S59-63368

Patent Document 2: Japanese Patent Laid-Open No. 2003-70573

SUMMARY OF THE INVENTION

Problems to be Solved by Invention

However, even if the device is stopped as in Patent Document 1 or the light is blocked by the shutter as in Patent Document 2, there is a problem that the heat remaining in the heat source raises the temperature of the sheet further.

Therefore, it is an object of the present invention to provide a drying device capable of quickly separating a sheet from a heat source when an abnormality occurs and an image forming system including the drying device.

Means of Solving the Problems

The drying device according to the present invention is a drying device which dries a sheet while conveying the sheet. The drying device includes a conveying part which conveys the sheet in a predetermined conveyance direction; a heating part which is arranged above the conveying part and dries the sheet conveyed by the conveying part; and a supporting part which supports the conveying part in a heating position where the sheet is heated by the heating part, by power supplying, wherein when the power supplying to the supporting part is cut off, a force by which the conveying part is supported in the heating position is weakened, and the conveying part is lowered to a retreating position separated downward from the heating part.

The drying device may include a buffer member supporting the lowered conveying part.

In the drying device, the conveying part has two end portions on an upstream side and on a downstream side in the conveyance direction, when, of the two end portions, one end portion is defined as a first end portion, and the other end portion is defined as a second end portion, the conveying part is supported in a turnable manner between the heating position and the retreating position around a turning fulcrum provided in the first end portion, and the supporting part supports the second end portion of the conveying part.

In the drying device, the turning fulcrum is arranged on the upstream side or on the downstream side in the conveyance direction with respect to an area facing the heating part in the conveying part.

In the drying device, the conveying part includes a driving roller, a driven roller, and an endless belt stretched between the driving roller and the driven roller, and the driven roller is arranged in the first end portion and the driving roller is arranged in the second end portion.

In the drying device, the supporting part includes: a wire; an inversion part arranged above the conveying part positioned in the heating position and inverting a wiring direction of the wire from a downward direction to an upward direction; a winding pulley arranged below the inversion part and winding the wire; an electric motor configured to rotate the winding pulley; and a torque limiter arranged between the electric motor and the winding pulley, wherein the wire is stretched from the winding pulley to the second end portion via the inversion part, when the electric motor is powered to rotate the winding pulley, the wire is wound around the winding pulley, the second end portion of the conveying part is lifted until the second end portion abuts on the drying part, and the conveying part is turned in the heating position, a power supplying to the electric motor continues while the conveying part is turned in the heating position, and the motor continues to idle with respect to the winding pulley due to action of the torque limiter, when the power supplying to the electric motor is cut off, the winding pulley becomes rotatable freely, the winding pulley is rotated by a weight of the conveying part to deliver the wire, the conveying part is turned from the heating position to the retreating position by its own weight.

An image forming system according to the present invention includes the drying device; and an image forming device which ejects ink on a sheet to form an image, and conveys the sheet having the image to the drying device.

An image forming system according to the other aspect of the present invention includes the drying device; an image forming device which ejects ink on a sheet to form an image, and conveys the sheet having the image to the first end portion of the drying device.

Effects of the Invention

According to the present invention, when the power supplying is cut off, the conveying part is turned from the heating position to the retreating position, and is quickly separated from the heating part, so that the possibility of overheating of the conveying part due to heat remaining in the heating part can be reduced.

EMBODIMENT FOR CARRYING OUT THE INVENTION

Hereinafter, with reference to the attached drawings, an image forming system and a drying device according to one embodiment of the present invention will be described.

Figure 1:
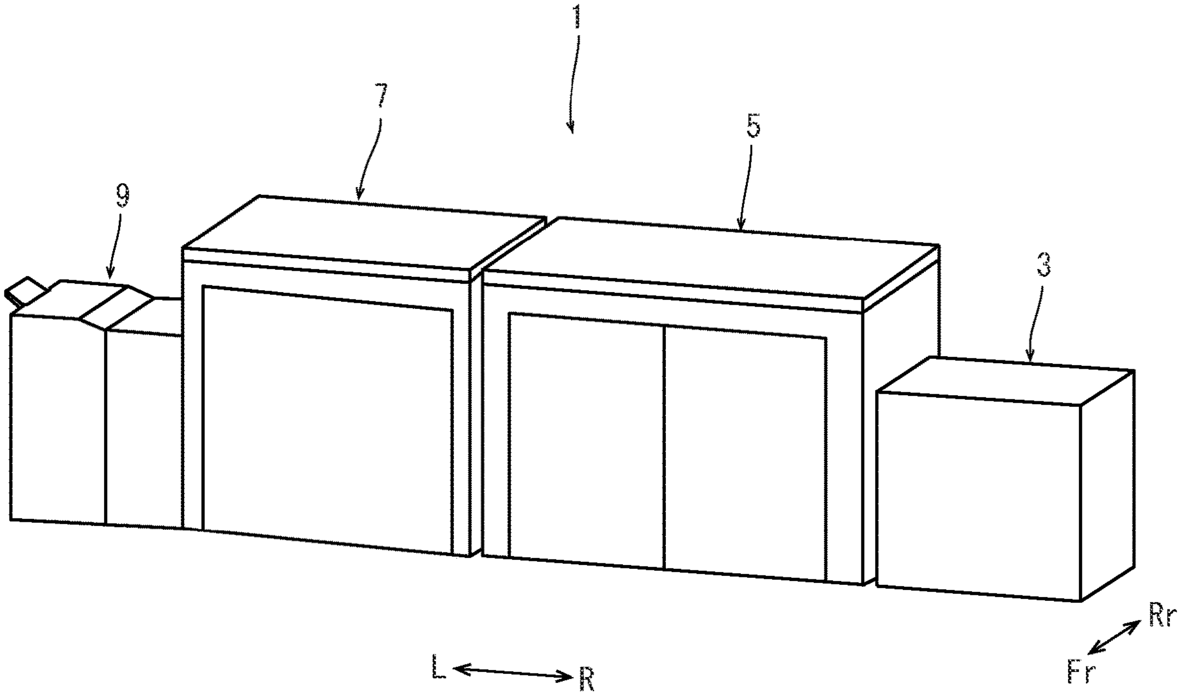
FIG. 1 is a front view schematically showing an image forming system including a drying device according to one embodiment of the present invention.

First, with reference to FIG. 1, an image forming system including a drying device will be described. FIG. 1 is a front view showing the imaging system including the drying device. Arrows L, R, Fr and Rr appropriately attached to each figure indicate the left, right, front and rear sides of the drying device, respectively.

The image forming system 1 includes a sheet feeding device 3, an image forming device 5, a drying device 7, and a post-processing device 9. The sheet feeding device 3 houses the sheets, and feeds the sheet to the image forming device 5. The image forming device 5 is arranged on the left side of the sheet feeding device 3, and forms an image on the sheet fed from the sheet feeding device 3 by inkjet method. The drying device 7 is arranged on the left side of the image forming device 5, and dries the sheet on which the image is formed, while conveying the sheet. The post-processing device 9 is arranged on the left side of the drying device 7 to perform post-processing on the sheet dried by the drying device 7.

Figure 2:
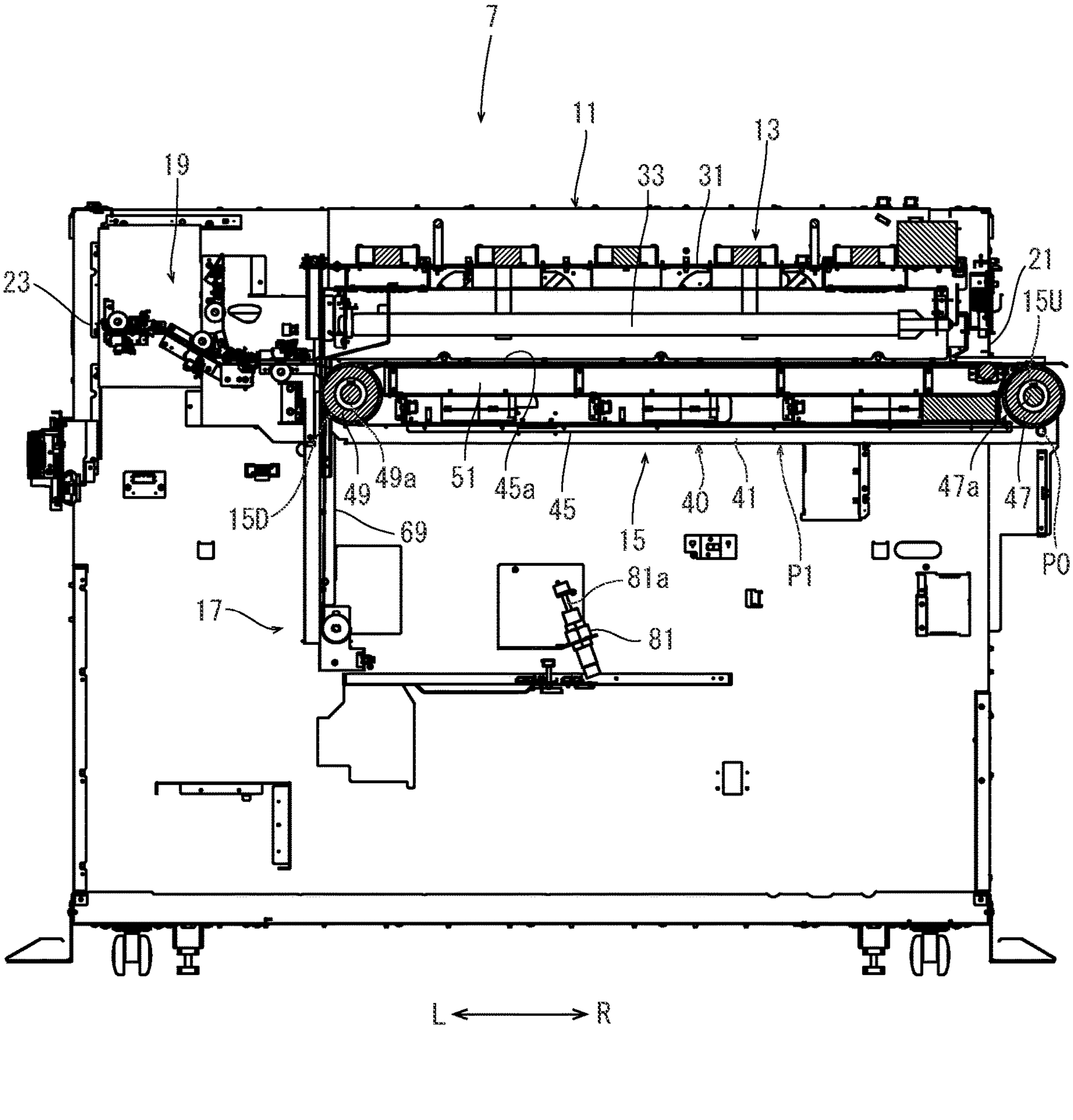
FIG. 2 is a sectional view showing an inside of the drying device (during drying operation), viewed from the front side, according to the embodiment of the present invention.
Figure 3:
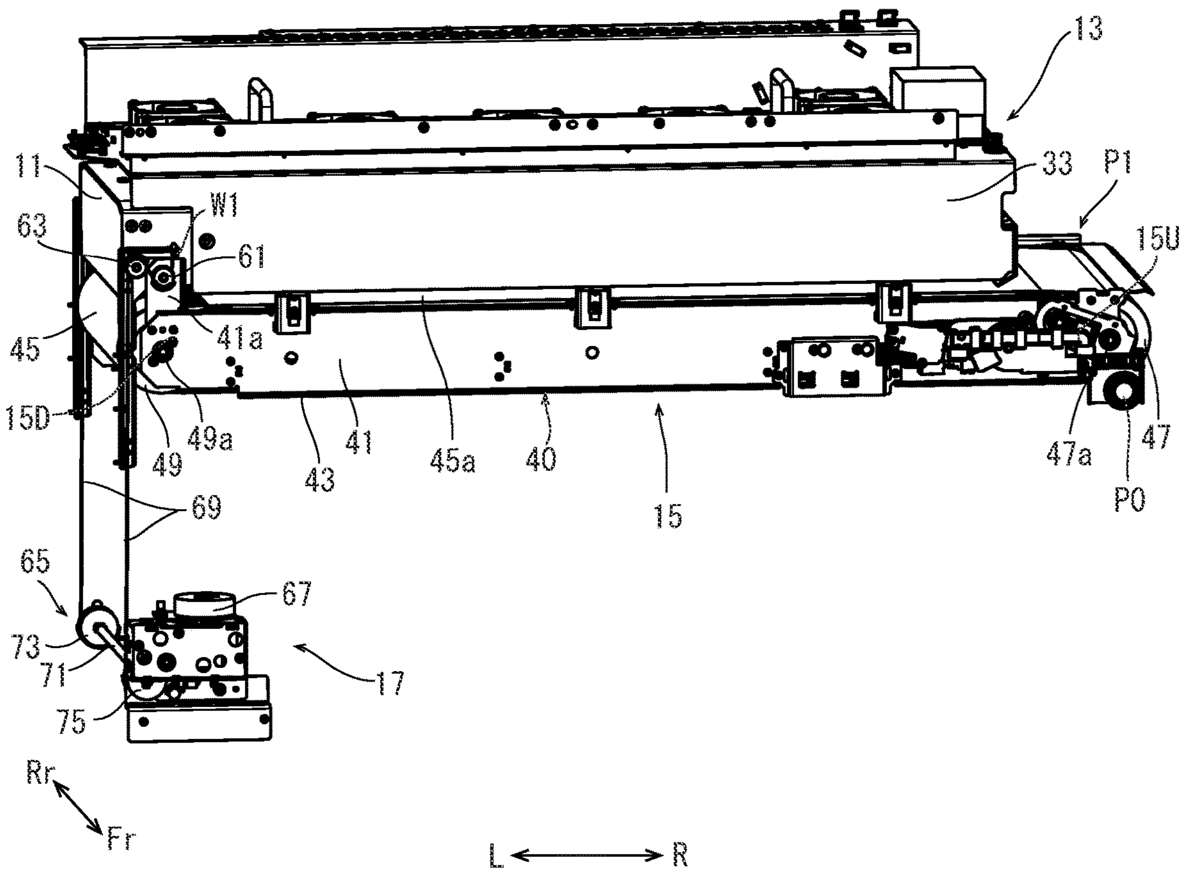
FIG. 3 is a perspective view showing a drying part, a conveying part and a supporting part of the drying device according to the embodiment of the present invention.

Next, the drying device 7 will be described with reference to FIG. 2 and FIG. 3. FIG. 2 is a sectional view showing the inside of the drying device (during drying operation), viewed from the front side, and FIG. 3 is a perspective view showing the drying part, the conveying part and the supporting part.

As shown in FIG. 2, the drying device 7 has a box-shaped housing 11. The housing 11 has a parallelepiped hollow space surrounded by an upper plate, a bottom plate, front and rear side plates, and left and right side plates. In the hollow space of the housing 11, a heating part 13, a conveying part 15, and a supporting part 17 are housed in order from the upper side, on the side of the image forming device 5 (right side). In the upper portion of the hollow portion of the housing 11, a cooling part 19 is housed on the side of the post-processing device (left side).

In the upper portion of the right side plate (the side plate on the side of the image forming device 5) of the housing 11, a receiving port 21 is formed to receive the sheet from the image forming device 5. In the upper portion of the left side plate (the side plate on the side of the post-processing device 9), a discharging port 23 is formed to pass the sheet to the post-processing device 9. Along the conveyance direction from the receiving port 21 to the discharging port 23, the sheet is conveyed by the conveying part 15 and the cooling part 19, which will be described later. In the following descriptions, the upstream side and the downstream side indicate the upstream side and the downstream side in the sheet conveyance direction, respectively.

The heating part 13 includes a housing case 31 and a halogen lamp 33 as a heat source housed in the housing case 31. The housing case 31 has a box shape with the lower surface opened. There is a gap between the upstream and downstream ends of the housing case 31 and the conveying part 15. The sheet conveyed by the conveying part 15 enters the housing case 31, that is the heating part 13, through the upstream side gap, and exits the housing case 31 through the downstream side gap. The halogen lamp 33 lights up and emits infrared rays when powered. The heating part 13 is arranged above the receiving port 21 almost horizontally so that the longitudinal direction is along the conveyance direction. The drying part 13 is provided with a temperature sensor (not shown).

In a case where an image is formed using a recording medium having a low penetrating property, such as a coated paper, as a sheet, a part of the ink remains on the sheet in liquid state for a long time, and the image may be blurred. Such a sheet needs to be sufficiently dried with a lot of heat before it is stacked on another sheet or the image-formed surface is rubbed in the image forming system 1. In particular, when drying a large number of sheets of more than 50 sheets per minute, it is necessary to increase the amount of heat given by the heating part 13.

As a heating method, methods using heat transferring, convection and radiation are used, and a hot-air drying method and a radiation heat drying method are mainly employed in the drying device 7. In particular, a hot-air drum drying method is commonly employed. In the hot-air drum drying method, the temperature of hot air heated by a sheath heater is relatively low such as about 120 degrees, so the drying efficiency is poor and the drying time (drying distance) needs to be prolonged. In this embodiment, the drying efficiency is enhanced by employing the radiation heating. However, the radiant heating has problems that the temperature continues to rise as the object absorbs infrared radiation and temperature control is difficult. For example, if the sheet stays just below the heating part 13 for a long time during the image forming operation on the sheet, the sheet may be overheated. The drying device 7 of this embodiment has the following configuration for such problems associated with the radiation heating.

As shown in FIG. 3, the conveying part 15 includes a casing 40, an endless conveyance belt 45, a driven roller 47 and a driving roller 49 and a suction device 51 (see FIG. 2) which are housed in the casing 40. The casing 40 has front and rear side plates 41 and a bottom plate 43. Both end portions of the rotational shaft **47*a* of the driven roller 47 are rotatably supported between the upstream end portions of the front and rear side plates 41. Both end portions of the rotational shaft 49*a* of the driving roller 49 are rotatably supported between the downstream end portions of the front and rear side plates 41. The rotational shaft 49*a* of the driving roller 49** is driven by an electric motor (not shown) to be rotated.

The conveyance belt 45 is stretched both the rollers 47 and 49. When the driving roller 49 is rotated in the counterclockwise direction of FIG. 2 and FIG. 3, the conveyance belt 45 circulates between the rollers 47 and 49 in the counterclockwise direction of FIG. 2 and FIG. 3, and the sheet placed on the upper surface of the conveyance belt 45 is conveyed along the conveyance direction. The surface along the upper traveling track of the conveyance belt 45 stretched between both the rollers 47 and 49 is defined as the conveyance surface **45*a*. The length of the conveyance surface 45*a* along the conveyance direction is formed to be equal to the length of the heating part 13 or longer than the heating part 13. The suction device 51 is arranged in the hollow portion of the conveyance belt 45 and supported by the front and rear side plates 41. During sheet conveying, the sheet is attracted to the conveyance surface 45***a* by the suction device 51.

The conveying part 15 has end portions on the upstream side and the downstream side, respectively. The two end portions are respectively ⅓, preferably ⅕ and more preferably 1/10 of the length of the conveying part 15 in the conveyance direction. Of the two end portions, the end portion where the turning fulcrum P0 described later is provided is defined as a first end portion 15U and the other end portion is defined as the second end portion 15D. In this embodiment, the first end portion 15U is the upstream end portion of the conveying part 15, and the second end portion 15D is the downstream end portion of the conveying part. In this embodiment, the driven roller 47 is arranged at the first end portion 15U and the driving roller 49 is arranged at the second end portion 15D.

The conveying part 15 is arranged below the heating part 13. The conveying part 15 is supported so as to be turnable around the turning fulcrum P0 in the first end portion 15U between a heating position P1 where the conveyance surface 45*a* of the conveyance belt 45 is supported approximately horizontally with a prescribed distance from the halogen lamp 33 of the heating part 13 and a retreating position P2 where the conveyance surface 45*a* is separated downward from the halogen lamp 33. The turning fulcrum P0 is arranged on the upstream side of the upstream end of the heating part 13. In other words, the turning fulcrum P0 is arranged on the upstream side with respect to the area facing the heating part 13 in the conveying part 15. The turning fulcrum P0 is positioned slightly below the rotational shaft 47*a* of the driven roller 47. At the heating position P1, a part of the front side plate 41 of the conveying part 15 comes into contact with the front side plate of the housing case 31 of the heating part 13.

Figure 4:
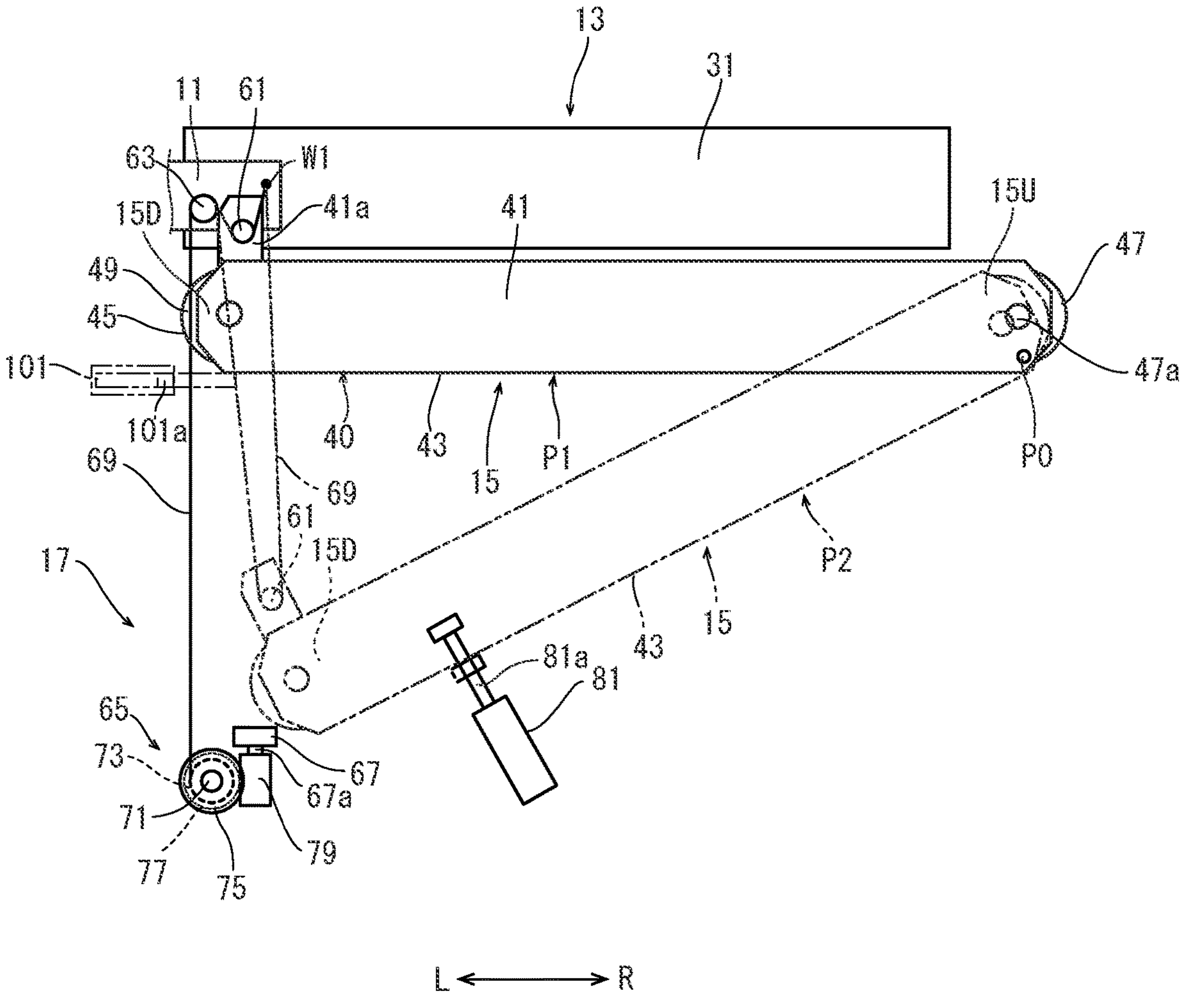
FIG. 4 is a front view schematically showing the supporting part of the drying device according to the embodiment of the present invention.

The supporting part 17 will be described with reference also to FIG. 4. FIG. 4 is a front view schematically showing the supporting part. The supporting part 17 lifts and lowers the second end portion 15D of the conveying part 15 to support the conveying part 15 in the heating position P1 and in the retreating position P2. The supporting part 17 includes movable pulleys 61 provided in the conveying part 15, fixed pulley 63 provided in the housing 11, a winding pulley 65 provided in the housing 11 below the conveying part 15, an electric motor 67 for driving the winding pulley 65, and two wires 69 which are hung between the housing 11 and the winding pulley 65.

The movable pulleys 61 are supported by support plates 41*a* extending upward from the front and rear side plates 41 of the casing 40 of the second end portion 15D of the conveying part 15.

The fixed pulleys 63 are supported by the front and rear side plates of the housing 11. The fixed pulleys 63 are supported on the downstream side (left side) of the movable pulleys 61 and slightly above the movable pulleys 61 in a state where the conveying part is supported in the heating position P1.

The winding pulley 65 has a rotational shaft 71 and front and rear winding rollers 73 fixed to the rotational shaft 71 at a predetermined interval. The winding pulley 65 is arranged below the fixed pulleys 63 with prescribed intervals in a posture parallel to the rotational shaft 47*a* of the driven roller 47. A driving gear 75 is fixed to one end (front end) of the rotational shaft 71. A torque limiter 77 is arranged between the rotational shaft 71 and the driving gear 75.

One ends of the two wires 69 are connected and secured to the winding rollers 73 of the front and rear winding pulleys 65. The other ends of the two wires 69 are fixed to the fixing positions W1 of the front and rear side plates of the housing 11. The wire 69 is wound around the movable pulley 61 and the fixed pulley 63 in order from the upper end. The other ends of the two wires 69 may be fixed to the second end portion 15D of the conveying part 15 without providing the movable pulley 61. That is, the other ends of the two wires 69 are indirectly or directly connected to the second end portion 15D of the conveying part 15. In this embodiment, the fixing position W1 is formed in the housing 11 on the side of the second end portion 15D of the conveying part 15, but it may be fixed to the housing 11 on the side of the first end portion 15U. The lower ends of the two wires 69 are fixed to the front and rear winding rollers 73 of the winding pulley 65. The wire 69 is wound around the movable pulley 61 and the fixed pulley 63 in order from the upper end side.

A gear 79 is fixed to the output shaft 67*a* of the electric motor 67. The electric motor 67 is positioned so that the gear 79 is engaged with the driving gear 75 of the winding pulley 65. When the electric motor 67 is driven in one direction and the winding pulley 65 is rotated in the counterclockwise direction of FIG. 3 and FIG. 4, the wires 69 are taken up by the winding roller 73 of the winding pulley 65, the movable pulleys 61 are lifted and the second end portion 15D of the conveying part 15 is lifted. When the electric motor 67 is driven in the other direction and the winding pulley 65 is rotated in the clockwise direction in FIG. 3 and FIG. 4, the wires 69 are unwound from the winding roller 73, the movable pulley 61 is lowered and the second end portion 15D of the conveying part 15 is lowered. Thus, by rotating the electric motor 67 in one direction and in the other direction, the conveying part 15 can be turned between the heating position P1 and the retreating position P2.

Generally speaking, the wire 69 is stretched from the winding pulley 65 to the conveying part 15 via an inversion part where the wiring direction of the wire 69 is inverted from the downward direction to the upward direction. In this embodiment, the fixed pulley 63 is an example of the inversion part. The inversion part is arranged above the conveying part 15 positioned in the heating position P1. The winding pulley 65 is positioned below the inversion part and further below the conveying part 15 positioned in the heating position P1. The torque limiter 77 is positioned below the inversion part and further below the conveying part 15 positioned in the heating position P1. The electric motor 67 is positioned below the inversion part and further below the conveying part 15 positioned in the heating position P1.

With the configuration as described above, the drive mechanism arranged above the conveying part 15 positioned in the heating position P1 is substantially only the inversion part. With this configuration, the conveying part 15 can be driven by the drive mechanism provided in the vicinity of the heating part 13, which has a limited space and is in a severe environment due to heat.

In addition, a buffer member 81 is arranged in the housing 11. The buffer member 81 absorbs the shock when the conveying part 15 is turned from the heating position P1 to the retreating position P2. The buffer member 81 is, for example, an air cylinder. The buffer member 81 is positioned on the upstream side (right side) of the electric motor 67 in such a manner that the direction of expansion and contraction of the piston is along the rotation trajectory of the conveying part 15. While the conveying part 15 is turned from the heating position P1 to the retreating position P2, the bottom plate 43 of the conveying part 15 abuts against the buffer member 81.

As shown in FIG. 2, the cooling part 19 is formed from the downstream end of the conveying part 15 toward the discharging port 23.

Figure 5:
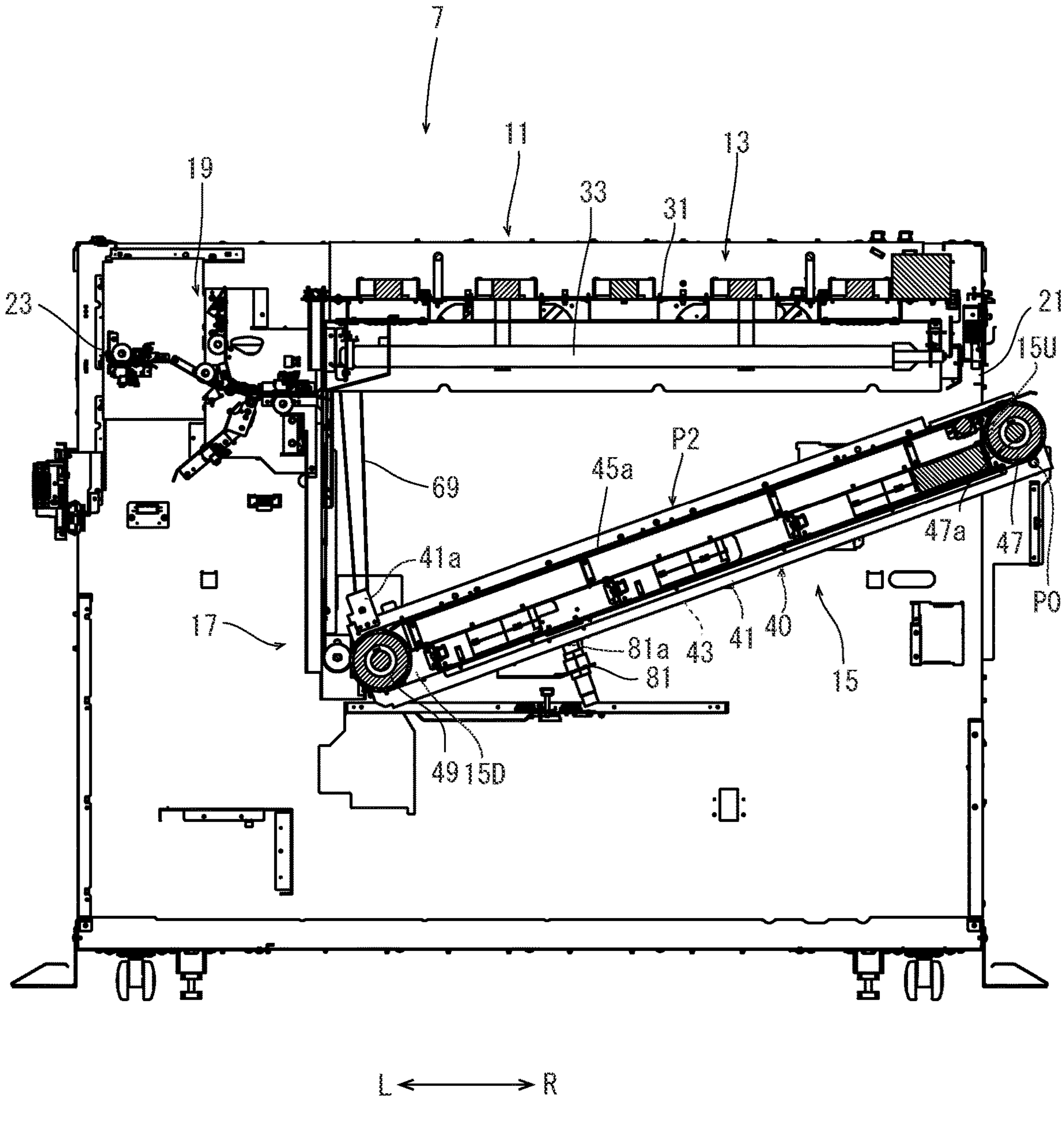
FIG. 5 is a sectional view showing the inside of the drying device (during waiting), viewed from the front side, according to the embodiment of the present invention.

One example of the drying operation of the drying device 7 having the above configuration will be described with reference to FIG. 2 to FIG. 4 and FIG. 5. FIG. 5 is a sectional view, viewed from the front side, showing the inside of the drying device (during waiting).

During the waiting shown in FIG. 5, the electric motor 67 is not powered, and the conveying part 15 is turned in the retreating position P2. At the start of the drying operation, the halogen lamp 33 is energized and lit to emit infrared rays. Furthermore, the electric motor 67 is driven to be rotated in one direction, and as described above, the wires 69 are wound around the winding pulley 65 to lift the second end portion 15D of the conveying part 15. The second end portion 15D of the conveying part 15 is lifted until a part of the front side plate 41 abuts on the front side plate of the housing case 31 of the heating part 13, and as shown in FIG. 2, the conveying part 15 is turned in the heating position P1. The electric motor 67 continues to be driven while the conveying part 15 is turned in the heating position P1, that is, while the drying operation is carried out. However, since the torque limiter 77 is arranged between the electric motor 67 and the winding pulley 65, the electric motor 67 continues to idle with respect to the winding pulley 65 during this time due to the action of the torque limiter 77.

After the conveying part 15 is turned in the heating position P1, the sheet on which the image is formed is received from the image forming device 5 through the receiving port 21 to the conveyance surface 45*a* of the conveyance belt 45 of the conveying part 15. The received sheet is attracted on the conveyance surface 45*a* of the conveyance belt 45 by the suction device and conveyed by the rotation of the driving roller 49. During this time, the infrared rays emitted from the halogen lamp 33 evaporate the moisture in the ink and dry the sheet. The sheet is conveyed from the conveying part 15 to the cooling part 19 for cooling, and then discharged from the discharging port 23 to the post-processing device 9.

If an abnormality occurs in the drying device 7 or the image forming device 5 or if a power failure occurs during the drying operation, the power supplying to the drying device 7 is automatically cut off. Then, the halogen lamp 33 turns off, and the electric motor 67 stops rotating. As a result, the force by which the conveying part 15 is supported in the heating position P1 by the electric motor 67 is weakened and substantially disappears, the winding pulley 65 becomes freely rotatable, and the winding pulley 65 is rotated by the weight of the conveying part 15 to deliver the wires 69. As a result, as shown in FIG. 5, the conveying part 15 is turned by its own weight from the heating position P1 to the retreating position P2. During the turning, the bottom plate 43 of the casing 40 of the conveying part 15 is received by the buffer member 81 and turned to the retreating position P2 while supported by the buffer member 81. When the abnormality or power failure is resolved, after confirming that there are no sheets left in the conveying part 15 or the like and the temperature of the heating part 13 detected by the temperature sensor, the electric motor 67 is driven to lift the conveying part 15 from the retreating position P2 to the heating position P1.

After the drying operation is completed normally, the rotation direction of the electric motor 67 is switched and rotated in the other direction, and the wires 69 are delivered from the winding pulley 65. With this, the second end portion 15D of the conveying part 15 is lowered, and the conveying part 15 is turned in the retreating position P2.

As described above, according to the drying device 7 of the present invention, when an abnormality occurs in the drying device 7 or the image forming device 5 or when a power failure occurs, the power supplying to the drying device 7 is cut off, and the conveying part 15 is automatically turned from the heating position P1 to the retreating position P2. Since the conveying part 15 is quickly separated from the heating part 13 in this way, the possibility of overheating of the conveying part 15 due to heat remaining in the heating part 13 can be reduced.

Furthermore, since the turning of the conveying part 15 to the retreating position P2 is buffered by the buffer member 81, the generation of collision sound and the damage of the conveying part 15 can be reduced.

Furthermore, since the conveying part 15 is supported in a turnable manner between the heating position P1 and the retreating position P2 around the first end portion 15U, a configuration for supporting the conveying part 15 can be simplified compared with a configuration for moving the whole of the conveying part 15 upward and downward, for example.

Furthermore, in the conveying part 15, the sheet conveyed from the image forming device 5 can be received on the side of the first end portion 15U having a small amount of movement, thus simplifying the structure of the sheet discharge part of the image forming device 5 or the connection structure between the image forming device 5 and the drying device 7.

Further, the driven roller 47 is arranged at the first end portion 15U of the conveying part 15 on the side where the sheet is received from the image forming device 5. Since the drive mechanism is arranged around the driving roller 49, its structure becomes more complicated than that around the driven roller 47. Therefore, by arranging the driven roller 47 at the first end portion 15U connected to the image forming device 5, the connection structure between the image forming device 5 and the drying device 7 can be simplified.

Furthermore, the first end portion 15U of the conveying part 15 is arranged on the upstream side of the upstream end of the heating part 13. Therefore, the distance between the first end portion 15U of the conveying part 15 and the heating part 13 can be made as long as possible when the conveying part 15 is turned to the retreating position P2. Therefore, the possibility of overheating of the entire conveying part 15 can be further reduced.

In this embodiment, the turning fulcrum P0 is arranged on the upstream side with respect to the area facing to the heating part 13 in the conveying part 15. When the first end portion 15U having the turning fulcrum P0 is arranged on the downstream side of the conveying part 15, the turning fulcrum P0 is arranged on the downstream side with respect to the area facing the heating part 13 in the conveying part 15. Accordingly, the possibility of overheating of the entire of the conveying part 15 can be further reduced as in the present embodiment.

The conveying part 15 may be supported in the heating position P1 by a solenoid 101 (see FIG. 4). In this case, the solenoid 101 is supported by the housing 11 (see FIG. 2) so that the plunger 101*a* expands and contracts in the horizontal direction. After the supporting part 17 is driven to lift the conveying part 15 in the heating position P1, the solenoid 101 is energized to advance the plunger 101*a*, and the conveying part 15 is supported in the heating position P1 by the plunger 101*a*. Then, the power supplying to the supporting part 17 is stopped and the electric motor 67 of the supporting part 17 is stopped.

When an abnormality occurs in the drying device 7 or the image forming device 5 or when a power failure occurs, the power supplying to the solenoid 101 is cut off and the plunger 101*a* is pulled by a pressing force such as a spring. Then, the force by which the conveying part 15 is supported in the heating position P1 disappears, and the conveying part 15 is turned from the heating position P1 to the retreating position P2. In this case, since it is not necessary to keep the electric motor 67 energized during the drying operation, the increase in power consumption of the electric motor 67 and the generation of noise can be reduced. When the conveying part 15 is supported by the solenoid 101, the conveying part 15 may be manually lifted from the retreating position P2 to the heating position P1.

Although the invention has been described for a specific embodiment, the invention is not limited to the above embodiment. Those skilled in the art are able to modify the above embodiment as long as it does not deviate from the scope and spirit of the invention.

The invention claimed is:

1. A drying device which dries a sheet while conveying the sheet, the drying device comprising:
a conveying part which conveys the sheet in a predetermined conveyance direction;
a heating part which is arranged above the conveying part and dries the sheet conveyed by the conveying part; and
a supporting part which supports the conveying part in a heating position where the sheet is heated by the heating part, by power supplying, wherein
when the power supplying to the supporting part is cut off, a force by which the conveying part is supported in the heating position is weakened, and the conveying part is lowered to a retreating position separated downward from the heating part.

2. The drying device according to claim 1, wherein
the conveying part is lowered to the retreating position by its own weight.

3. The drying device according to claim 1, comprising:
a buffer member supporting the lowered conveying part.

4. The drying device according to claim 1, wherein
the conveying part has two end portions on an upstream side and on a downstream side in the conveyance direction,
when, of the two end portions, one end portion is defined as a first end portion, and the other end portion is defined as a second end portion,
the conveying part is supported in a turnable manner between the heating position and the retreating position around a turning fulcrum provided in the first end portion, and
the supporting part supports the second end portion of the conveying part.

5. The drying device according to claim 4, wherein
the turning fulcrum is arranged on the upstream side or on the downstream side in the conveyance direction with respect to an area facing the heating part in the conveying part.

6. The drying device according to claim 5, wherein
the turning fulcrum is arranged on the upstream side in the conveyance direction with respect to the area.

7. The drying device according to claim 4, wherein
the conveying part includes a driving roller, a driven roller, and an endless belt stretched between the driving roller and the driven roller, and
the driven roller is arranged in the first end portion and the driving roller is arranged in the second end portion.

8. The drying device according to claim 4, wherein
the supporting part includes:
a wire;
an inversion part arranged above the conveying part positioned in the heating position and inverting a wiring direction of the wire from a downward direction to an upward direction;
a winding pulley arranged below the inversion part and winding the wire;
an electric motor configured to rotate the winding pulley; and
a torque limiter arranged between the electric motor and the winding pulley, wherein
the wire is stretched from the winding pulley to the second end portion via the inversion part,
when the electric motor is powered to rotate the winding pulley, the wire is wound around the winding pulley, the second end portion of the conveying part is lifted until the second end portion abuts on the drying part, and the conveying part is turned in the heating position,
a power supplying to the electric motor continues while the conveying part is turned in the heating position, and the motor continues to idle with respect to the winding pulley due to action of the torque limiter,
when the power supplying to the electric motor is cut off, the winding pulley becomes rotatable freely, the winding pulley is rotated by a weight of the conveying part to deliver the wire, the conveying part is turned from the heating position to the retreating position by its own weight.

9. An image forming system comprising:
the drying device according to claim 4; and
an image forming device which ejects ink on a sheet to form an image, and conveys the sheet having the image to the first end portion of the drying device.

10. The drying device according to claim 1, wherein
the heating part heats the sheet by radiant heat.

11. An image forming system comprising:
the drying device according to claim 1; and
an image forming device which ejects ink on a sheet to form an image, and conveys the sheet having the image to the drying device.

* * * * *